(12) United States Patent
Dasdan (10) Patent No.: US 7,953,775 B2
(45) Date of Patent: May 31, 2011

(54) SHARING TAGGED DATA ON THE INTERNET

(75) Inventor: Ali Dasdan, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 754 days.

(21) Appl. No.: 11/594,520

(22) Filed: Nov. 7, 2006

(65) Prior Publication Data

US 2008/0109881 A1     May 8, 2008

(51) Int. Cl.
*G06F 12/00* (2006.01)
(52) U.S. Cl. ........................................ 707/830; 715/206
(58) Field of Classification Search .................. 707/3, 4, 707/5, 9, 821, 822, 825, 828, 830; 715/206
See application file for complete search history.

(56) References Cited

U.S. PATENT DOCUMENTS

| | | | |
|---|---|---|---|
| 7,321,889 B2 * | 1/2008 | Smadja et al. | 707/2 |
| 2003/0030679 A1 * | 2/2003 | Jain | 345/854 |
| 2003/0197735 A1 * | 10/2003 | Woltzen | 345/777 |
| 2007/0038603 A1 * | 2/2007 | Guha | 707/3 |

OTHER PUBLICATIONS

Richard Keller, A bookmarking service for organizing and sharing URLs, 1997, Elsevier Science B.V. p. 1103-1114.*
David Millen, Dogear:Social Bookmarking in the Enterprise, Apr. 22-27, 2006, ACM, p. 111-120.*
del.icio.us, social bookmarking, http//del.icio.us/, 2 pages, print date: Jan. 18, 2007.
Flickr: Explore! http://www.flickr.com/explore/, 2 pages, print date: Jan. 18, 2007.

* cited by examiner

*Primary Examiner* — Hosain T Alam
*Assistant Examiner* — Amy Ng
(74) *Attorney, Agent, or Firm* — Hickman Palermo Truong & Becker (57) ABSTRACT

People are enabled to share tagged data via the Internet. In one embodiment, an Internet site receives, via the Internet, from various different users, content items of many different content types. The site also receives a tag for each content item and maps that tag to that content item. When other users supply search query terms, the site selects tags that match the search query terms. The site presents content items that are mapped to the selected tags. Using this technique, users are able to share with each other content items of all different content types using a single Internet site, without needing to store content items of different types on different Internet sites. In order to share a particular content item with other users, the user who wants to share the content item needs only to disclose the particular content item's tag to the other users.

6 Claims, 8 Drawing Sheets

SHARING TAGGED DATA ON THE INTERNET

FIELD OF THE INVENTION

The present invention relates to search engines and, more specifically, to a technique for sharing tagged data on the Internet.

BACKGROUND

The Internet site "del.icio.us" (pronounced and referred to as "delicious" below) is essentially a collection of bookmarks to users' favorite Internet-accessible resources (e.g., web pages, files, images, movies, documents, etc.). Using "delicious," users can maintain bookmarks to their favorite articles, blogs, music, reviews, recipes, and more. Users can access the bookmarks from any Internet-connected computer. Users can use "delicious" to share their favorite bookmarks with friends, family, coworkers, and the "delicious" community. Users can use "delicious" to discover new things. Every bookmark to which "delicious" refers is someone's favorite, and that someone has already done the work of finding the resource to which that bookmark refers. "Delicious" is full of bookmarks about technology, entertainment, useful information, and more.

"Delicious" is a social bookmarking Internet site. "Bookmarks" are references to Internet-accessible resources. Bookmarks are often implemented as links. Bookmarks can be used to instruct an Internet browser application to access (request, receive, and store or present) resources to which those bookmarks refer. Users primarily use "delicious" to store their bookmarks online rather than in a browser application. Because "delicious" allows users to store their bookmarks online, "delicious" allows users to access their collections of bookmarks from any computer. The online-oriented nature of "delicious" also allows users to add bookmarks to their collections from any computer. Users of "delicious" can use tags (discussed below) to organize and remember (save) their bookmarks.

Users also can use "delicious" to see the interesting bookmarks of their friends and other people, and to share bookmarks with those friends and other people in return. Users can browse and search "delicious" to discover useful bookmarks that others have saved. Browsing and searching bookmarks is made easy with tags.

As used herein, "tags" are verbal descriptors that users can assign to and associate with things—in the case of "delicious," the things to which the tags are assigns are bookmarks. Each tag comprises one or more user-chosen words and/or symbols. Users can assign as many different tags to a bookmark as they like. Users can rename and delete tags as they choose. Because tags are user-chosen, users can assign, to bookmarks of their choice, tags that are indicative of the subjective meaning that those users ascribe to the resources to which those bookmarks refer. Because the same resources might have different subjective meanings to different users, different users might assign different tags to the same resource. For many users, tagging bookmarks with tags of their own choosing is much easier and more flexible than fitting bookmarks into rigid categories or folders preconceived by others.

Although "delicious" is a very useful and popular system for sharing bookmarks, currently, "delicious" can only be used to tag bookmarks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed for enabling people to share tagged data via the Internet. In one embodiment of the invention, a single Internet site receives, via the Internet, from various different users, content items of many different content types (e.g., bookmarks, images, documents, movies, music, files, etc.). The site stores these diverse content items. From each user from which a content item was received, the site also receives a user-customized content item identifier (a "tag") for that content item. For each content item, the site maps that content item to the tag received from the user from whom that content item was received. Tags are often different from file names of, and data contained in, the content items to which those tags are mapped.

When other, searching users supply search query terms to the site via the Internet, the site selects, from among all of the stored tags, tags that match the search query terms. The site presents, to these searching users, content items that are mapped to the selected tags. Using this technique, users are able to share with each other content items of all different content types using a single Internet site, without needing to store content items of different types on different Internet sites. In order to share a particular content item with other users, the user who wants to share the content item needs only to disclose the particular content item's tag to the other users. By associating differently-typed content items with the same tag, a user can easily share multiple differently-typed content items with other users.

According to one embodiment of the invention, users who are searching only for content items that have specific content types can specify those content types to the site. In response to receiving user-specified content types in conjunction with search query terms, the site omits, from the content items that the site presents in response to receiving the search query terms, all content items whose content types are not among the user-specified content types. As a result, content items whose content types are not among the user-specified content types are not presented to the user who specified the content types, even if those content items are mapped to tags that match the search query terms.

Under some conditions, a user might want to share a content item with only a limited group of other users. Therefore, in one embodiment of the invention, when the site receives a content item from a user who wants to share that content item, the site also receives, from that user, a password and/or a list of authorized user identifiers. The site maps the content item to the password and/or list of authorized user identifiers. Later, if the site determines that the content item's tag matches a set of search query terms that the site received from a searching user, the site performs authorization operations prior to presenting that content item to the searching user. If the content item is mapped to a password, then the site determines whether a password supplied by the searching user matches the password that is mapped to the content item. If the content item is mapped to a list of authorized user identifiers, then the site determines whether the searching user's user identifier (supplied by the searching user when the searching user logged in to the site, for example) is among the list of authorized user identifiers. If the searching user's supplied password does not match the password mapped to the content item, or if the searching user's user identifier is not among the list of authorized user identifiers mapped to the content item, then the site does not present the content item to the searching user, even if the content item's tag matches the search query terms.

In at least some embodiments of the invention, different users are not prevented from mapping the same tag to different content items. Sometimes, though, a user might want to ensure that the content items that he wants to share with other users will be the only content items that the site presents when those other users enter search query terms that the content items' tags match, so that those other users do not become confused. Consequently, the sharing user might want to ensure that the tags that are mapped to his content items are unique among tags maintained by the site. Therefore, in one embodiment of the invention, in response to a user's request for a unique tag, the site determines whether a tag proposed by the user is currently mapped to any other content item stored on the site. If the proposed tag is currently mapped to at least one other content item stored on the site, then the site informs the user that the proposed tag is not unique, and allows the user to propose a different tag. Under such circumstances, the site may suggest different unique tags from which the user can select. Alternatively, in one embodiment of the invention, in response to a user's request for a unique tag, the site automatically generates a tag that is not currently mapped to any other content item stored on the site, and provides this tag to the user.

Using the techniques described herein, content can be shared in any of a number of modes. A single user can share content with a single specified user. Additionally, a single user can share content with many users. Additionally, many users can share content with a single specified user. Additionally, many users can share content with many other users.

An example of a system in which the techniques described herein may be practiced is described in greater detail below.

Example System

Figure 1:
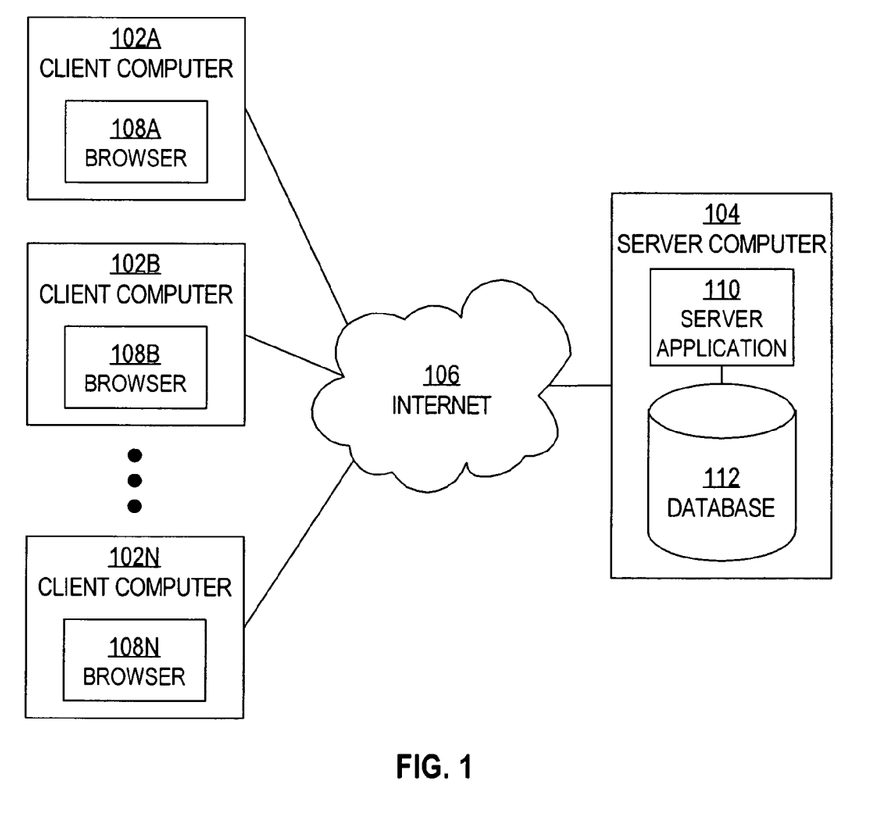
FIG. 1 is a block diagram that illustrates an example of a system in which users can search for tagged content that is stored on an Internet-accessible server, according to an embodiment of the invention.

FIG. 1 is a block diagram that illustrates an example of a system in which users can search for tagged content that is stored on an Internet-accessible server, according to an embodiment of the invention. Alternative embodiments of the invention may include more, fewer, or different components than those illustrated in the example of FIG. 1.

FIG. 1 shows client computers 102A-N, a server computer 104, and the Internet 106. Each of client computers 102A-N and server computer 104 generally take the form of the device described below with reference to FIG. 6.

On each of client computers 102A-N, an Internet browser application ("browser"), such as Mozilla Firefox, executes. These browsers are shown as browsers 108A-N. A server application 110 executes on server computer 104. Browsers 108A-N can communicate with server application 110 by exchanging data over Internet 106. Typically, this communication is accomplished using a suite of protocols (e.g., Transport Control Protocol (TCP), Internet Protocol (IP), and Hypertext Transfer Protocol (HTTP)). Browsers 108A-N accept input from users and present, to those users, data received via Internet 106. Typically, such data comes in the form of web pages.

Typically, browsers 108A-N send HTTP requests to server application 110. Server application 110 receives these HTTP requests, performs operations based on the data specified by these HTTP requests, and responds to these HTTP requests by sending appropriate HTTP responses back to browsers 108A-N. Typically, the HTTP responses specify the content of web pages that are generated by server application 110 and that are to be displayed by browsers 108A-N. The content of such web pages usually depends at least in part on the content of the HTTP requests that caused those web pages to be generated. The content of the HTTP requests, in turn, typically depends on input that browsers 108A-N received from users.

Server application 110 stores data in and retrieves data from a database 112, which, in one embodiment of the invention, also resides on server computer 104. Database 112 contains data that server application 110 receives through Internet 106 and stores in database 112. Database 112 also contains data that server application 110 retrieves for use in generating web pages that server application 110 sends over Internet 106.

In one embodiment of the invention, the data that browsers 108A-N send over Internet 106 toward server application 110 include content items of various content types, user-specified tags that are to be mapped to those content items, and user-specified search query terms. Server application 110 stores the received content items. Server application 110 also stores, in database 112, mappings between these content items and the user-specified tags that are to be associated with these content items. Server application 110 queries database 112 for content items that match specified criteria. For example, server application 110 may query database 112 for tags that match the user-specified search query terms received from browsers 108A-N. In one embodiment of the invention, the data that server application 110 sends toward browsers 108A-N over Internet 106 include content items that are mapped to tags that match the user-specified search query terms received from browsers 108A-N.

Examples of techniques that may be practiced within the system of FIG. 1 are described in greater detail below.

Sharing Tagged Content Items of Different Content Types

Each content item has an associated content type. Inasmuch as some content types may be sub types of other content types, some content items may have more than one associated content type. For example, content types include bookmarks, files, documents, movies, music, images, and/or other categories of information and media. As used herein, a bookmark is a content item that is a reference to another content item's location on the Internet. Thus, a tag that is mapped to a bookmark that refers to a particular content item is not the same as a tag that is mapped directly to that particular content item. According to an embodiment of the invention, content items of various different content types may be stored and retrieved through a single Internet site that is hosted on server computer 104, for example.

Figure 2:
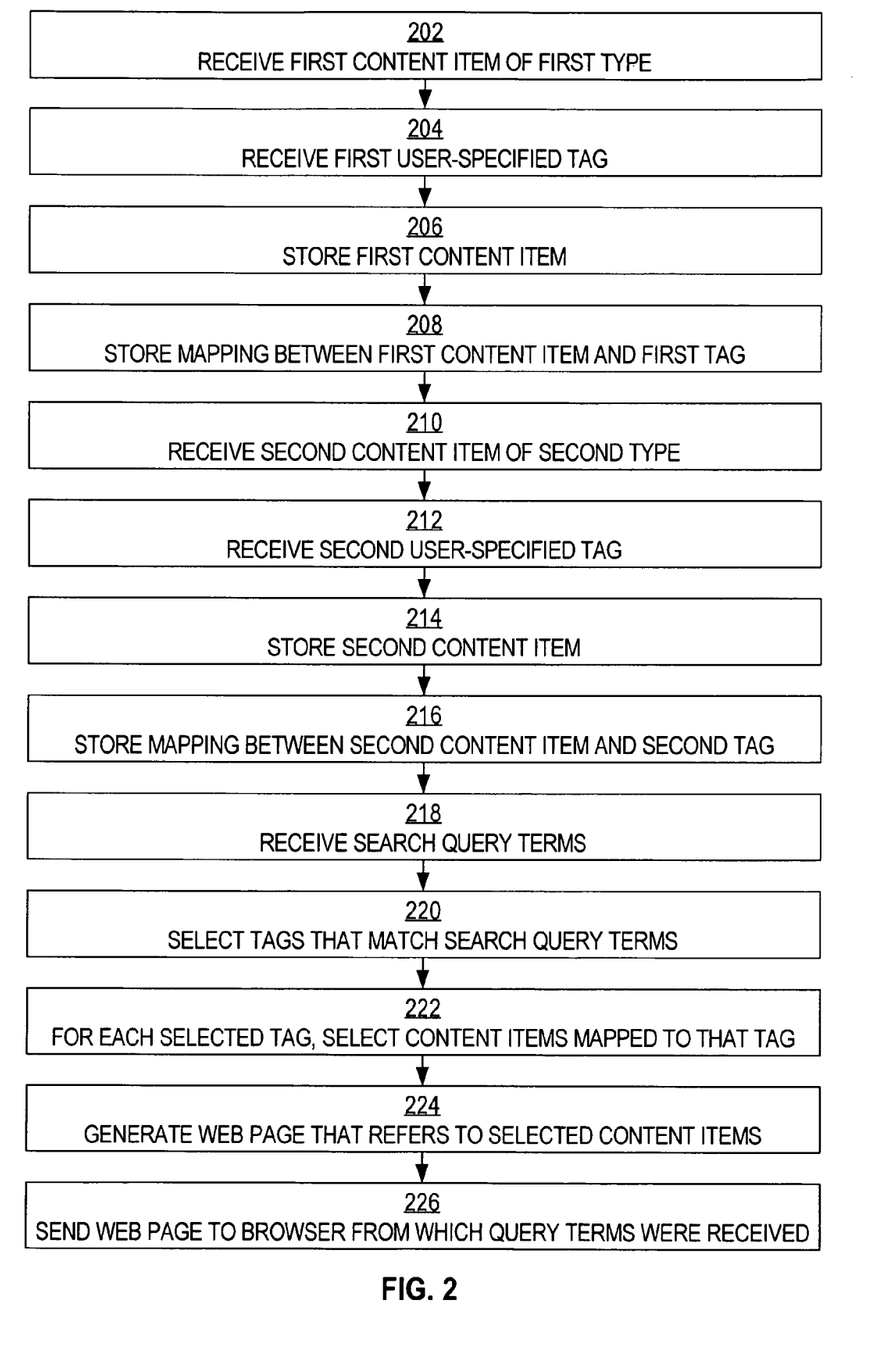
FIG. 2 is a flow diagram that illustrates an example of a technique by which content items of different content types may be stored at and retrieved from an Internet-accessible site, according to an embodiment of the invention.

FIG. 2 is a flow diagram that illustrates an example of a technique by which content items of different content types may be stored at and retrieved from an Internet-accessible site, according to an embodiment of the invention. Alternative embodiments of the invention may include more, fewer, or different steps than those illustrated in the example of FIG. 2. The technique illustrated in FIG. 2 is described with reference to the example system of FIG. 1.

In block 202, server application 110 receives a first content item that was sent by browser 108A. This first content item has a first content type. For example, the first content item might be a bookmark, in which case at least one content type of the first content item would be "bookmark."

In block 204, server application 110 receives a first user-specified tag that was sent by browser 108A. For example, the first tag might be "vacation."

In block 206, server application 110 stores the first content item. In block 208, server application 110 stores, in database 112, a mapping between the first content item and the first tag.

In block 210, server application 110 receives a second content item that was sent by browser 108B. This second content item has a second content type that differs from the first content type. For example, the second content item might be an image, in which case at least one content type of the second content item would be "image."

In block 212, server application 110 receives a second user-specified tag that was sent by browser 108B. In this example, the second tag is the same as the first tag even though the content types of the content items to which these tags correspond are different. For example, the second tag might also be "vacation."

In block 214, server application 110 stores the second content item. In block 216, server application 110 stores, in database 112, a mapping between the second content item and the second tag.

In block 218, server application 110 receives search query terms that were sent by browser 108N. For example, server application 110 might receive, as at least one of the search query terms, the word "vacation."

In block 220, in response to receiving the search query terms, server application 110 selects, from a group of tags stored in database 112, selected tags that match at least one of the search query terms. For example, in response to receiving the search query term "vacation," server application 110 may select the first and second tags "vacation."

In block 222, for each selected tag, server application 110 selects, from a group of content items that server application 110 previously stored, one or more selected content items that are mapped to that tag. In the foregoing example, the first and second content items are both mapped to the selected tags, so server application 110 responsively selects the first and second content items.

In block 224, server application 110 generates a web page that includes a separate reference to each of the selected content items. In the foregoing example, the selected content items include the first and second content items, so server application 110 generates a web page that includes a reference to the first content item and a reference to the second content item (and possibly other selected content items). In one embodiment of the invention, the web page includes user-selectable hyperlinks to each of the selected content items. In another embodiment of the invention, the web page actually includes each of the content items (e.g., a bookmark for the first content item and an image for the second content item). The web page does not include any reference to any content item that is not mapped to a selected tag.

In block 226, server application 110 sends the generated web page toward browser 108N in response to the search query terms received from browser 108N. Browser 108N receives the web page and displays the web page's contents to a user who submitted the search query terms.

Filtering Search Results Based on User-Specified Content Type

Figure 3:
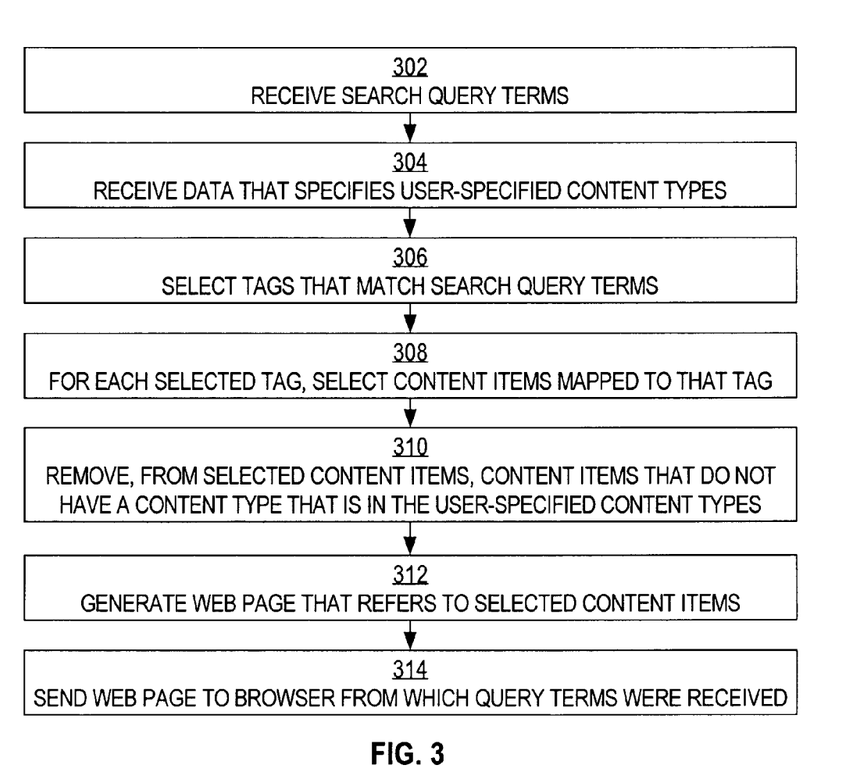
FIG. 3 is a flow diagram that illustrates an example of a technique by which the results of a search for content items that are associated with a specified tag are filtered based on content type before being presented to a user, according to an embodiment of the invention.

As is discussed above, sometimes, users might be interested in locating, among content items that are mapped to a specified tag, only those content items that also have certain user-specified content types. FIG. 3 is a flow diagram that illustrates an example of a technique by which the results of a search for content items that are associated with a specified tag are filtered based on content type before being presented to a user, according to an embodiment of the invention. Alternative embodiments of the invention may include more, fewer, or different steps than those illustrated in the example of FIG. 3. The technique illustrated in FIG. 3 is described with reference to the example system of FIG. 1.

In block 302, server application 110 receives search query terms that were sent by browser 108N. For example, server application 110 might receive, as at least one of the search query terms, the word "vacation."

In block 304, search application 110 receives, from browser 108N, data that specifies one or more user-specified content types. For example, server application 110 might receive data that specifies only the "image" content type.

In block 306, in response to receiving the search query terms, server application 110 selects, from a group of tags stored in database 112, selected tags that match at least one of the search query terms. For example, in response to receiving the search query term "vacation," server application 110 may select a "vacation" tag.

In block 308, for each selected tag, server application 110 selects, from a group of content items that server application 110 previously stored, one or more selected content items that are mapped to that tag. Continuing the foregoing example, if ten different content items were all mapped to the "vacation" tag, then server application 110 would responsively select all of these ten content items.

In block 310, server application 110 filters the selected content items by removing, from the set of selected content items, all content items that do not have at least one content type that is included in the one or more user-specified content types specified by the data received in block 304. Continuing the foregoing example, if five of the ten selected content items do not have the only (in this example) user-specified content type, "image," then server application 110 removes those five content items from the selected content items. Five content items, all of which have at least the "image" content type, then remain as selected content items.

In block 312, server application 110 generates a web page that includes a separate reference to each of the remaining selected content items. Continuing the foregoing example, the selected content items include the five content items that have at least the "image" content type, so server application 110 generates a web page that includes a reference to each of these five selected content items. The web page does not include any reference to any content item that is not mapped to a selected tag. Additionally, the web page does not include any reference to any content item that does not have a content type that is included in the one or more user-specified content types.

In block 314, server application 110 sends the generated web page toward browser 108N in response to the search query terms received from browser 108N. Browser 108N receives the web page and displays the web page's contents to a user who submitted the search query terms.

Restricting the Presentation of User-Specified Content Items

Figure 4A:
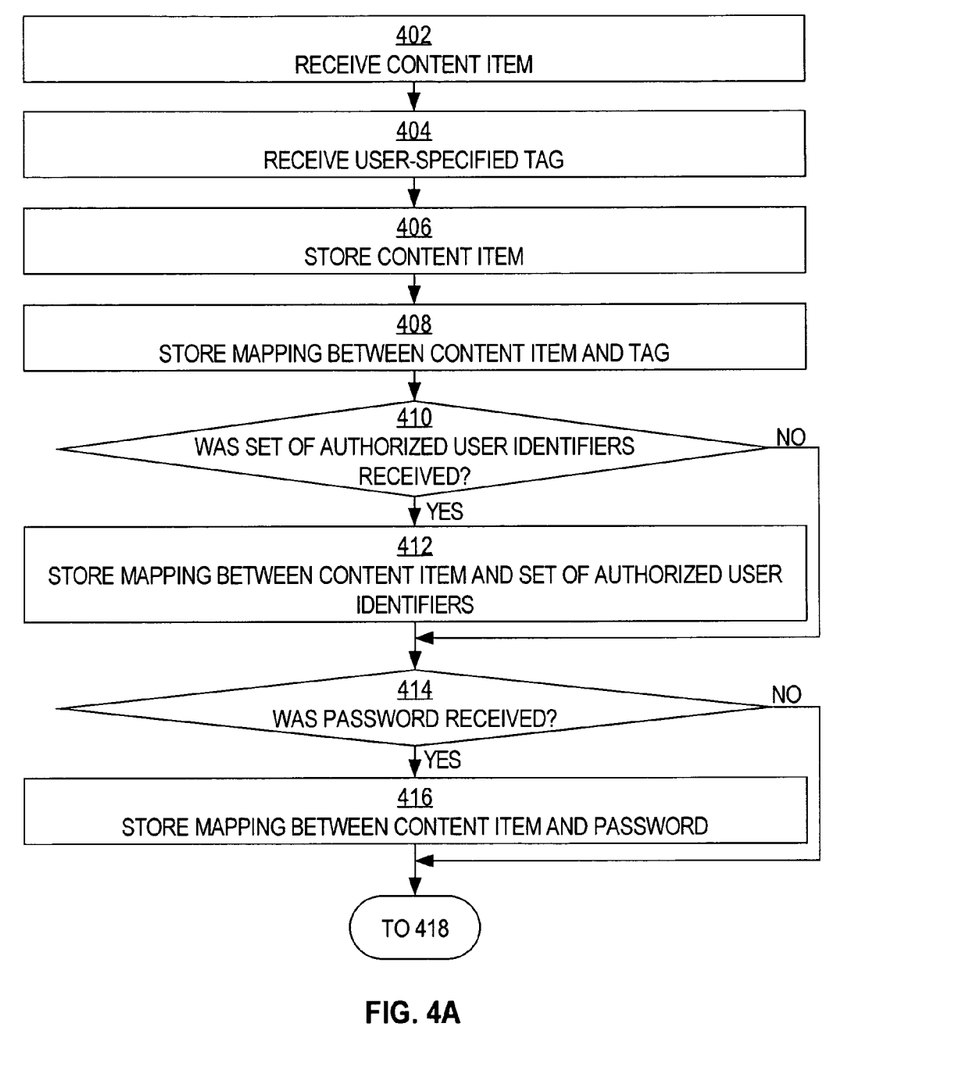
FIGS. 4A-B show a flow diagram that illustrates an example of a technique by which the presentation of a certain content item is restricted so that the content item is only presented when specified authorization criteria are satisfied, according to an embodiment of the invention.
Figure 4B:
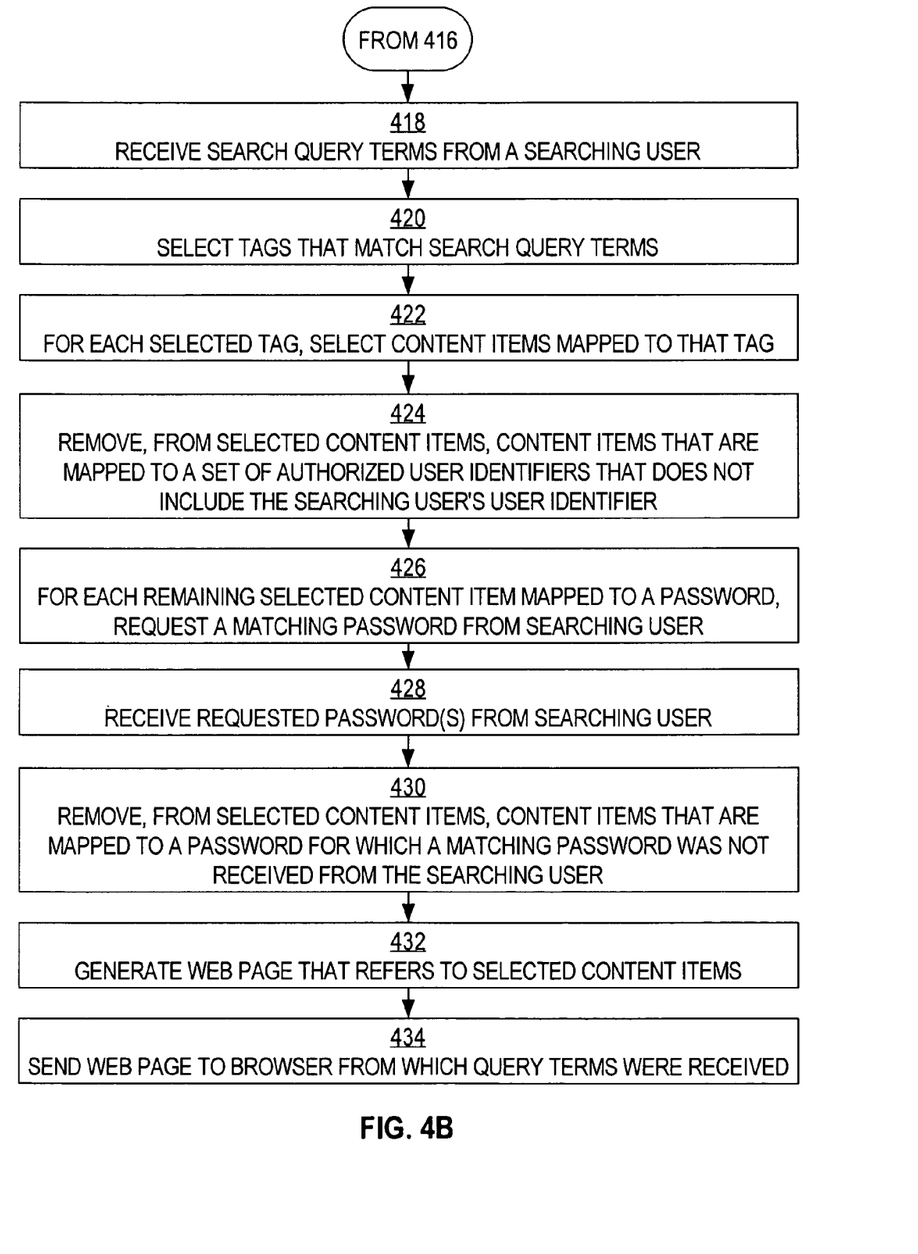

As is discussed above, under some conditions, a user might want to share a content item with only a limited group of other users. FIGS. 4A-B show a flow diagram that illustrates an example of a technique by which the presentation of a certain content item is restricted so that the content item is only presented when specified authorization criteria are satisfied, according to an embodiment of the invention. Alternative embodiments of the invention may include more, fewer, or different steps than those illustrated in the example of FIGS. 4A-B. The technique illustrated in FIGS. 4A-B is described with reference to the example system of FIG. 1.

Referring first to FIG. 4A, in block 402, server application 110 receives a content item that was sent by browser 108A. In block 404, server application 110 receives a user-specified tag that was sent by browser 108A. For example, the tag might be "vacation."

In block 406, server application 110 stores the content item. In block 408, server application 110 stores, in database 112, a mapping between the content item and the tag.

In block 410, server application 110 determines whether a set of one or more authorized user identifiers was also received from browser 108A. If a set of authorized user identifiers was received, then control passes to block 412. Otherwise, control passes to block 414.

In block 412, server application 110 stores, in database 112, a mapping between the content item and the set of authorized user identifiers. Control then passes to block 414.

In block 414, server application 110 determines whether an authorized password was also received from browser 108A. If an authorized password was received, then control passes to block 416. Otherwise, control passes to block 418 of FIG. 4B.

In block 416, server application 110 stores, in database 112, a mapping between the content item and the authorized password. Control then passes to block 418 of FIG. 4B.

Referring now to FIG. 4B, in block 418, server application 110 receives search query terms that were sent through by browser 108N by a particular user. For example, server application 110 might receive, as at least one of the search query terms, the word "vacation."

In one embodiment of the invention, before server application 110 will accept any search query terms from a user, server application 110 requires that user to "log in" by submitting, to server application 110, a user identifier, and, typically, an associated authentication credential.

In block 420, in response to receiving the search query terms, server application 110 selects, from a group of tags stored in database 112, selected tags that match at least one of the search query terms. For example, in response to receiving the search query term "vacation," server application 110 may select the tag "vacation."

In block 422, for each selected tag, server application 110 selects, from a group of content items that server application 110 previously stored, one or more selected content items that are mapped to that tag. Continuing the foregoing example, if ten different content items were all mapped to the "vacation" tag, then server application 110 would responsively select all of these ten content items. Although an embodiment of the invention described below involves filtering (in blocks 424 and 430) these selected content items based on specified authorization criteria, in another embodiment of the invention, only those of the content items that satisfy such specified authorization criteria are initially selected in block 422, making such filtering unnecessary.

In block 424, the server application filters the selected content items by removing, from the set of content items, all content items that are mapped to a set of authorized user identifiers that does not include a user identifier of the user of browser 108N (from whom the search query terms were received). As is discussed above, server application 110 may require the user of browser 108N to submit such a user identifier to server application 110 before server application 110 will accept search query terms from that user. For example, if one of the content items is mapped to a set of authorized user identifiers that consists only of "Fred," "Betty," and "Wilma," and if the user identifier of the user of browser 108N is "Barney," then server 110 removes that content item from the selected content items so that the content item will not be presented to the user of browser 108N.

In block 426, for each selected content item that is mapped to an authorized password in database 112, server application 110 requests, from browser 108N, the password that is mapped to that selected content item. In block 428, server application 110 receives requested passwords (if any) from browser 108N.

In block 430, server application 110 filters the remaining selected content items by removing, from the set of selected content items, all content items that are mapped to an authorized password for which a matching password for those content items was not received from browser 108N in block 426. For example, if one of the content items is mapped to the authorized password "jungle," and if a matching password for that content item was not received from browser 108N in response to the request that server 110 sent in block 424, then server 110 removes that content item from the selected content items so that the content item will not be presented to the user of browser 108N. Alternatively, instead of filtering all of the content items by removing (in blocks 424 and 430) content items for which specified authorization criteria (e.g., authorized user identity and matching password) are not satisfied, in one embodiment of the invention, only those content items for which these authorization criteria are satisfied are originally selected in block 422.

In block 432, server application 110 generates a web page that includes a separate reference to each of the remaining selected content items. The web page does not include any reference to any content item that is not mapped to a selected tag. Additionally, the web page does not include any reference to any content item that is mapped to a password for which a matching password was not received. Furthermore, the web page does not include any reference to any content item that is mapped to a set of authorized user identifiers that does not include a user identifier of a user from whom the search query terms were received.

In block 434, server application 110 sends the generated web page toward browser 108N in response to the search query terms received from browser 108N. Browser 108N receives the web page and displays the web page's contents to the user who submitted the search query terms.

Mapping Content Items to Unique Tags

As is discussed above, sometimes, a user might want to ensure that the content items that he wants to share with other users will be the only content items that the site presents when those other users enter search query terms that the content items' tags match, so that those other users do not become confused. Consequently, the sharing user might want to ensure that the tags that are mapped to his content items are unique among tags maintained by the site.

Figure 5A:
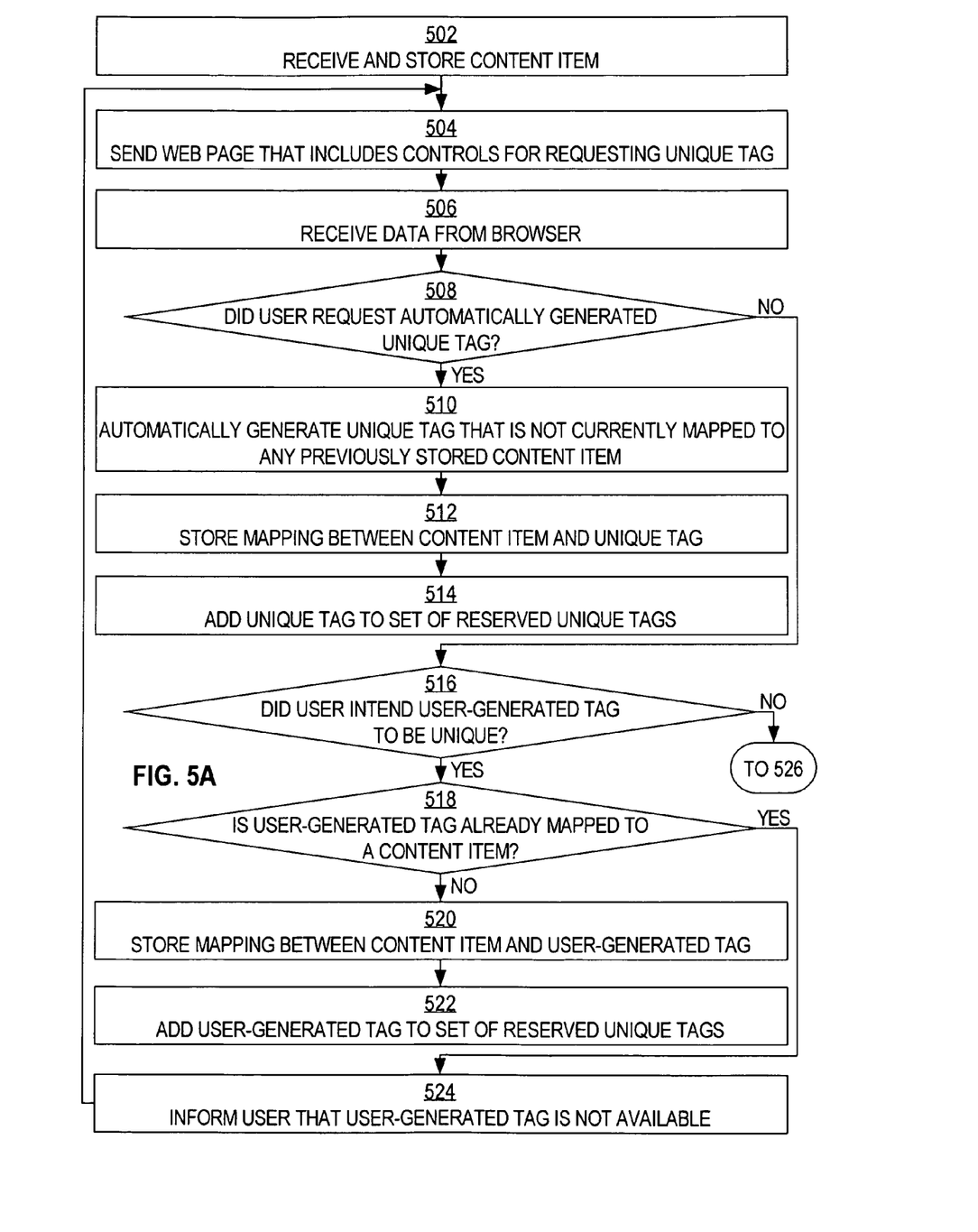
FIG. 5 is a flow diagram that illustrates an example of a technique by which a content item may be mapped to a tag that is unique among tags recognized by the site, according to an embodiment of the invention.
Figure 5B:
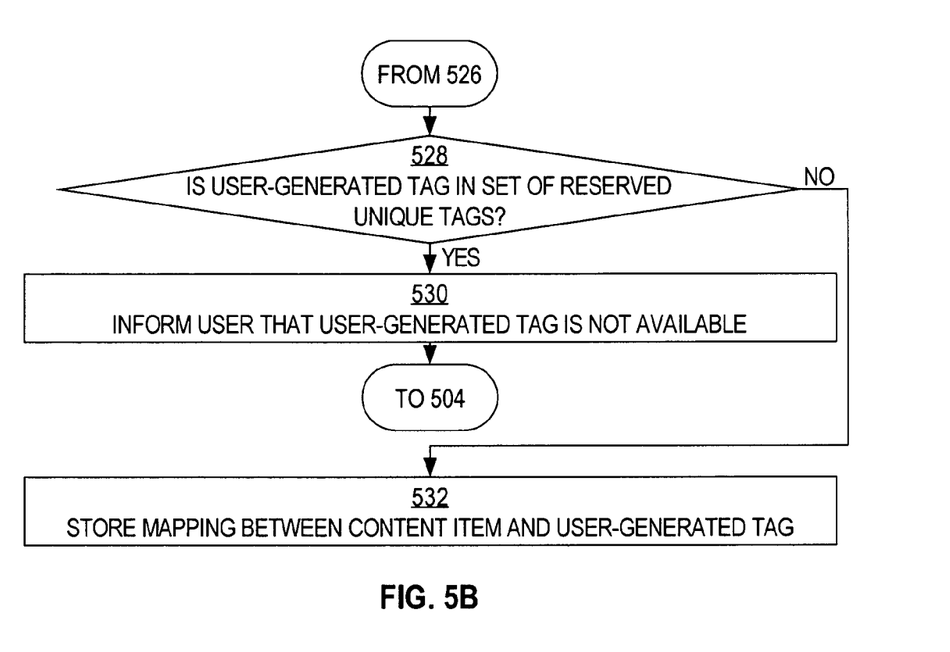

FIGS. 5A-B show a flow diagram that illustrates an example of a technique by which a content item may be mapped to a tag that is unique among tags recognized by the site, according to an embodiment of the invention. Alternative embodiments of the invention may include more, fewer, or different steps than those illustrated in the example of FIGS. 5A-B. The technique illustrated in FIGS. 5A-B is described with reference to the example system of FIG. 1.

Referring first to FIG. 5A, in block 502, server application 110 receives and stores a content item that was sent by browser 108A. In block 504, server application 110 sends, to browser 108A, a web page that comprises at least three controls. A first of these controls (e.g., a text entry field) is for receiving user input that specifies a user-generated tag. A second of these controls (e.g., a checkbox) is for receiving user input that indicates whether the user intends for the user-generated tag to be unique. A third of these controls (e.g., a button) is for allowing the user to request the automatic generation of a unique tag.

In block 506, server application 110 receives data from browser 108A. The data may, but does not need to, include a user-generated tag. In block 508, server application 110 determines whether the data indicates that the user has requested the automatic generation of a unique tag. If the data indicates that the user has requested the automatic generation of a unique tag, then control passes to block 510. Otherwise, control passes to block 516.

In block 510, server application 110 automatically generates a tag that is not currently mapped to any content item that server application 110 previously stored. For example, server application 110 may generate a random sequence of characters and compare the random sequence to all other existing tags in database 112 to determine whether the random sequence already has been used as a tag. If the random sequence has not already been used as a tag, then server application 110 may use the random sequence as a unique tag for the content item. If the random sequence has already been used as a tag, then server application 110 may repeat this process until a random sequence that has not already been used as a tag is discovered. For another example, server application 110 can take a hint tag from the user and modify that hint tag (e.g., by adding prefix or suffix characters) to create a unique tag. For example, if the user's hint tag is "vacation," but "vacation" is already a used tag, then server application 110 may suggest the unique tag "vacation 123" or "vacation [username]." In one embodiment of the invention, server application 110 generates multiple different unique tags and presents those tags to the user for selection. Under such circumstances, the user may indicate that the user does not prefer any of the presented tags. If the user so indicates, then server application 110 may continue to generate different unique tags until the user has selected a unique tag that meets the user's approval. Once a unique tag has been selected, control passes to block 512.

In block 512, server application 110 stores, in database 112, a mapping between the content item and the automatically generated unique tag. In block 514, server application 110 adds the automatically generated unique tag to a set of reserved unique tags. For example, the set of reserved unique tags may be stored in database 112.

Alternatively, in block 516, server application 110 determines whether the data (received in block 506) indicates that the user intends for the user-generated tag to be unique. For example, server application 110 might determine from the data whether the user checked a checkbox that indicates that the user intends for the user-generated tag to be unique. If the data indicates that the user intends for the user-generated tag to be unique, then control passes to block 518. Otherwise, control passes to block 526 of FIG. 5B.

In block 518, server application 110 compares the user-generated tag (indicated in the data received in block 506) to all other existing tags in database 112 to determine whether the user-generated tag is already mapped to a content item. If the user-generated tag is not already mapped to a content item, then control passes to block 520. Otherwise, control passes to block 524.

In block 520, server application 110 stores, in database 112, a mapping between the content item and the user-generated unique tag. In block 522, server application 110 adds the user-generated unique tag to the set of reserved unique tags discussed above with reference to block 514.

Alternatively, in block 524, server application 110 informs the user of browser 108A that the user-generated tag is not available. In one embodiment of the invention, server application 110 also suggests, to the user, one or more tags that (a) are similar to the user-generated tag but (b) are not already mapped to a content item. Control passes back to block 504.

Referring now to FIG. 5B, alternatively, in block 526, server application 110 determines whether the user-generated tag is contained in the set of reserved unique tags discussed above with reference to blocks 514 and 522. If the user-generated tag is contained in the set of reserved unique tags, then control passes to block 528. Otherwise, control passes to block 530.

In block 528, server application 110 informs the user of browser 108A that the user-generated tag is not available (because that tag has been reserved as a unique tag). In one embodiment of the invention, server application 110 also suggests, to the user, one or more tags that (a) are similar to the user-generated tag but (b) are not in the set of reserved unique tags. Control passes back to block 504 of FIG. 5A.

Alternatively, in block 530, server application 110 stores, in database 112, a mapping between the content item and the user-generated tag.

In one embodiment of the invention, each unique tag is associated with a time limit. After a specified period of time has passed since the unique tag's creation, that tag is removed from the set of reserved unique tags and can be used by other users. In another embodiment of the invention, a user is required to pay a specified sum of money in exchange for keeping each of his unique tags in the set of reserved unique tags.

Hardware Overview

Figure 6:
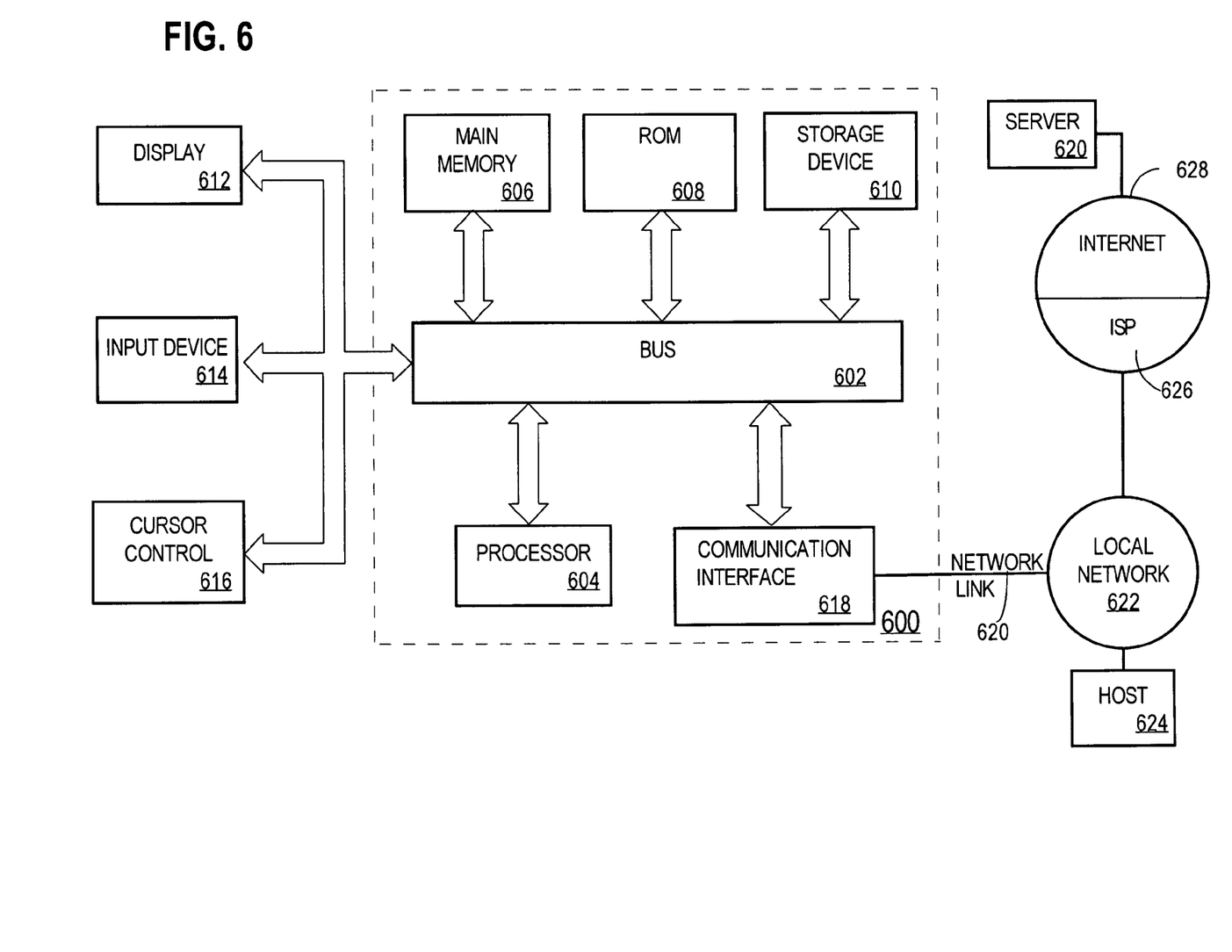
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising steps of:
   receiving a first content item at a server over the Internet from a user's computer;
   storing the first content item at the server, wherein the first content item has a first content type;
   receiving, at the server, over the Internet, from the user's computer, a particular content item identifier that differs from a file name of the first content item;
   storing, at the server, first associative data that maps the first content item to the particular content item identifier;
   receiving a second content item at the server over the Internet from the user's computer;
   storing the second content item at the server, wherein the second content item has a second content type that differs from the first content type; and
   storing, at the server, second associative data that maps the second content item to the particular content item identifier;
   wherein the particular content identifier differs from a file name of the second content item;
   receiving one or more search query terms that match the particular content item identifier;
   receiving data that specifies one or more specified content types;
   in response to receiving the one or more search query terms, selecting, from a group of content item identifiers, one or more selected content item identifiers that match the one or more search query terms;
   selecting, from a group of content items, one or more selected content items that are (a) mapped to the particular content item identifier and (b) have content types that are included in the one or more specified content types; and
   presenting a list of one or more content items, wherein the list (1) does not refer to any content item that is not mapped to any of the one or more selected content item identifiers; and (2) does not refer to any content item that does not have a content type that is included in the one or more specified content types; and wherein the steps are performed by one or more computing devices.

2. A method comprising particular steps of:
   storing a particular content item;
   receiving, over the Internet, from a user's computer, a proposed content item identifier that differs from a file name of the particular content item;
   receiving, over the Internet, from the user's computer, an indication of whether the proposed content item identifier is intended to be unique;
   if the indication indicates that the proposed content item identifier is intended to be unique, then performing first steps, wherein the first steps comprise:
   determining whether the proposed content item identifier is currently mapped to any content item in a group of one or more content items;
   if the proposed content item identifier is currently mapped to at least one content item in the group of one or more content items, then informing a user that the proposed content item identifier is not available; and
   if the proposed content item identifier is not currently mapped to any content item in the group of one or more content items, then storing associative data that maps the particular content item to the proposed content item identifier; and
   if the proposed content item identifier is not currently mapped to any content item in the group of one or more content items, then adding the proposed content item identifier to the set of unique content item identifiers; but
   if the indication indicates that the proposed content item identifier is not intended to be unique, then performing second steps, wherein the second steps comprise:
   determining whether the proposed content item identifier is the same as any unique content item identifier in a set of unique content item identifiers;
   if the proposed content item identifier is the same as at least one unique content item identifier in the set of unique content item identifiers, then informing a user that the proposed content item identifier is not available; and
   if the proposed content identifier is not the same as any unique content identifier in the set of unique content identifiers, then storing associative data that maps the particular content item to the proposed content item identifier;
   wherein the particular steps are performed by one or more computing devices.

3. The method of claim 2, further comprising:
   in response to receiving one or more search query terms, selecting, from a group of content item identifiers, one or more selected content item identifiers that match the one or more search query terms, wherein the one or more selected content item identifiers include a particular content item identifier that is mapped to the particular content item; and
   presenting a list of content items that (1) refers to at least the particular content item and (2) does not refer to any content item that is not mapped to any of the one or more selected content item identifiers.

4. A volatile or non-volatile machine-readable medium that stores instructions which, when executed by one or more processors, cause the one or more processors to perform the method of claim 1.

5. A volatile or non-volatile machine-readable medium that stores instructions which, when executed by one or more processors, cause the one or more processors to perform the method of claim 2.

6. A volatile or non-volatile machine-readable medium that stores instructions which, when executed by one or more processors, cause the one or more processors to perform the method of claim 3.

* * * * *